(12) United States Patent
Mitchell et al.

(10) Patent No.: US 6,563,592 B2
(45) Date of Patent: May 13, 2003

(54) INTERFEROMETRIC ALIGNMENT DEVICE

(75) Inventors: Robert R. Mitchell, Huntsville, AL (US); Gene H. Widenhofer, Madison, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 99 days.

(21) Appl. No.: 09/811,275

(22) Filed: Mar. 19, 2001

(65) Prior Publication Data

US 2002/0131051 A1 Sep. 19, 2002

(51) Int. Cl.[7] ................................................. G01B 9/02
(52) U.S. Cl. ...................................................... 356/508
(58) Field of Search ................................ 356/508, 509, 356/510

(56) References Cited

U.S. PATENT DOCUMENTS

| | | | |
|---|---|---|---|
| 4,168,429 A | 9/1979 | Lough | 250/330 |
| 4,472,632 A | 9/1984 | Durenec | 250/333 |
| 5,035,472 A | 7/1991 | Hansen | 350/1.1 |
| 5,513,034 A | 4/1996 | Sillitto et al. | 359/351 |
| 5,619,783 A * | 4/1997 | Yasuhira et al. | 356/508 |
| 5,757,491 A * | 5/1998 | Cai et al. | 356/508 |
| 5,886,786 A * | 3/1999 | Kanaya et al. | 356/508 |
| 5,912,736 A * | 6/1999 | Marcuse et al. | 356/508 |
| 5,969,817 A * | 10/1999 | Ohsawa | 356/510 |
| 6,160,628 A * | 12/2000 | Inoue | 356/500 |
| 6,327,038 B1 * | 12/2001 | Maxey | 356/508 |
| 2001/0006420 A1 * | 7/2001 | Kato | 356/510 |

* cited by examiner

Primary Examiner—Robert H. Kim
Assistant Examiner—Thomas R Artman
(74) Attorney, Agent, or Firm—Arthur H. Tischer; Dayn T. Beam; Hay Kyung Chang

(57) ABSTRACT

The interferometric alignment device is a small, compact device that can be attached to any two optical instruments that need to be aligned precisely in both pitch and yaw angles. The device utilizes light reflecting from mirrors that are permanently mounted inside the instruments, one mirror in each of the instruments. The reflected light beams exit their respective instruments via a window built into the frame of the instrument and re-enters the attached alignment device wherein they combine to form an interference pattern. The operator of the alignment device observes the fringes of this pattern and adjusts the azimuth and elevation of one instrument relative to the other instrument until the fringes are at an acceptable minimum number or are eliminated altogether.

1 Claim, 5 Drawing Sheets

INTERFEROMETRIC ALIGNMENT DEVICE

DEDICATORY CLAUSE

The invention described herein may be manufactured, used and licensed by or for the Government for governmental purposes without the payment to us of any royalties thereon.

BACKGROUND OF THE INVENTION

There is a need for a simple and quick way to align any two optical instruments so that their optical axes are exactly parallel. The need is particularly acute in the case of missiles such as TOW and HELLFIRE whose successful impact on the target depends on the axes of their guidance lasers, beam projectors or optical trackers being pointed with extreme accuracy at the target. Such a guidance device usually incorporates a day-sight (direct-view optical telescope) which is boresighted (brought into parallelism) to within 10–50 microradians of the optical axis of the guidance device. Alignment of such a high degree of accuracy cannot be easily set or adjusted in the field.

Where a tactical application precludes field adjustment, it is usually sufficient to use a guidance system that is designed for permanent internal alignment, in the factory, of the optical axes of the guidance device and the day-sight. However, permanent factory alignment is impractical when field installation is necessary, as when a night-sight attachment is needed. Mechanical attaching means, including kinematic mounts, are incapable of providing repeatably the required degree of accuracy in the optical alignment of the axes of the guidance device and the attached night-sight. At present, a night-sight is mechanically attached by the soldier to the guidance device at the point of use. Since this action usually leaves the two units firmly joined but misaligned, the current practice is to attach a boresight collimator, which unites the two objective optical axes within the collimator instrument, thereby allowing precise alignment. The disadvantage of this approach is that the collimator and its case, weighing at least ten pounds, must be carried on every mission that may require a night-sight. Further, the joining and aligning operation must be repeated every time even a gentle shock is applied to the assembly, such as moving a short distance or replacing the battery. In addition, the boresight collimator itself is a precision optical instrument that must be maintained in its internal alignment by means of a boresight collimator test set.

SUMMARY OF THE INVENTION

The interferometric alignment device is a small, compact device that can easily be attached to and detached from any two optical instruments, such as a laser designator and its night-sight, that need to be aligned precisely in pitch and yaw angles. The alignment device utilizes light reflecting from mirrors that are permanently mounted inside the instruments to be aligned, one mirror in each instrument. The light beams reflecting from the internal mirrors exit their respective instruments via a window built into the frame of the instrument and re-enter the alignment device wherein they combine to form an interference pattern. The operator of the alignment device observes the fringes of this pattern and adjusts the azimuth and elevation of one instrument relative to the other instrument until the fringes are at a minimum in number or are eliminated altogether, thereby leaving the field-of-view uniformly illuminated.

DESCRIPTION OF THE PREFERRED EMBODIMENT

Figure 1:
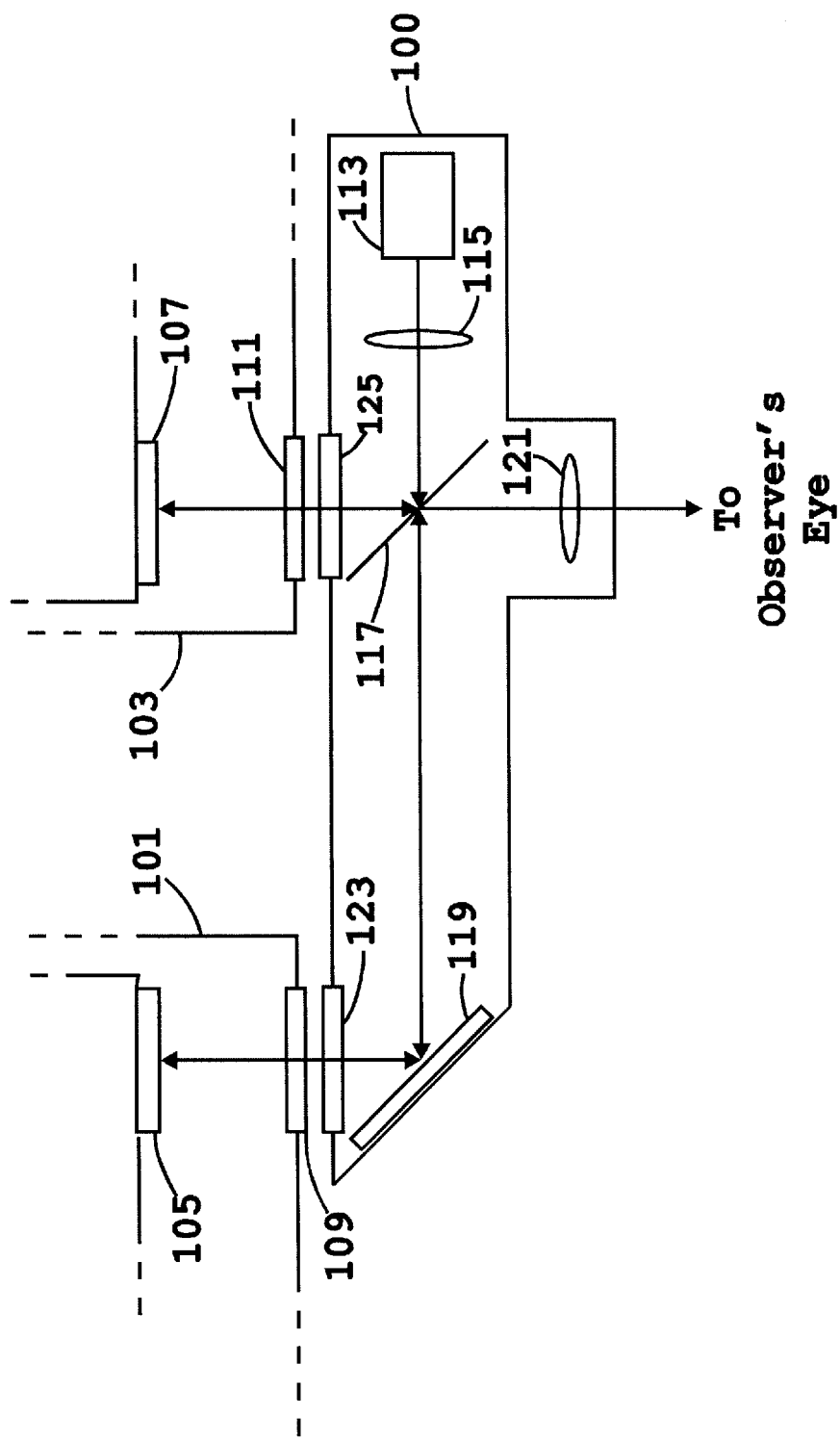
FIG. 1 depicts the interferometric alignment device 100 and its components.
Figure 2:
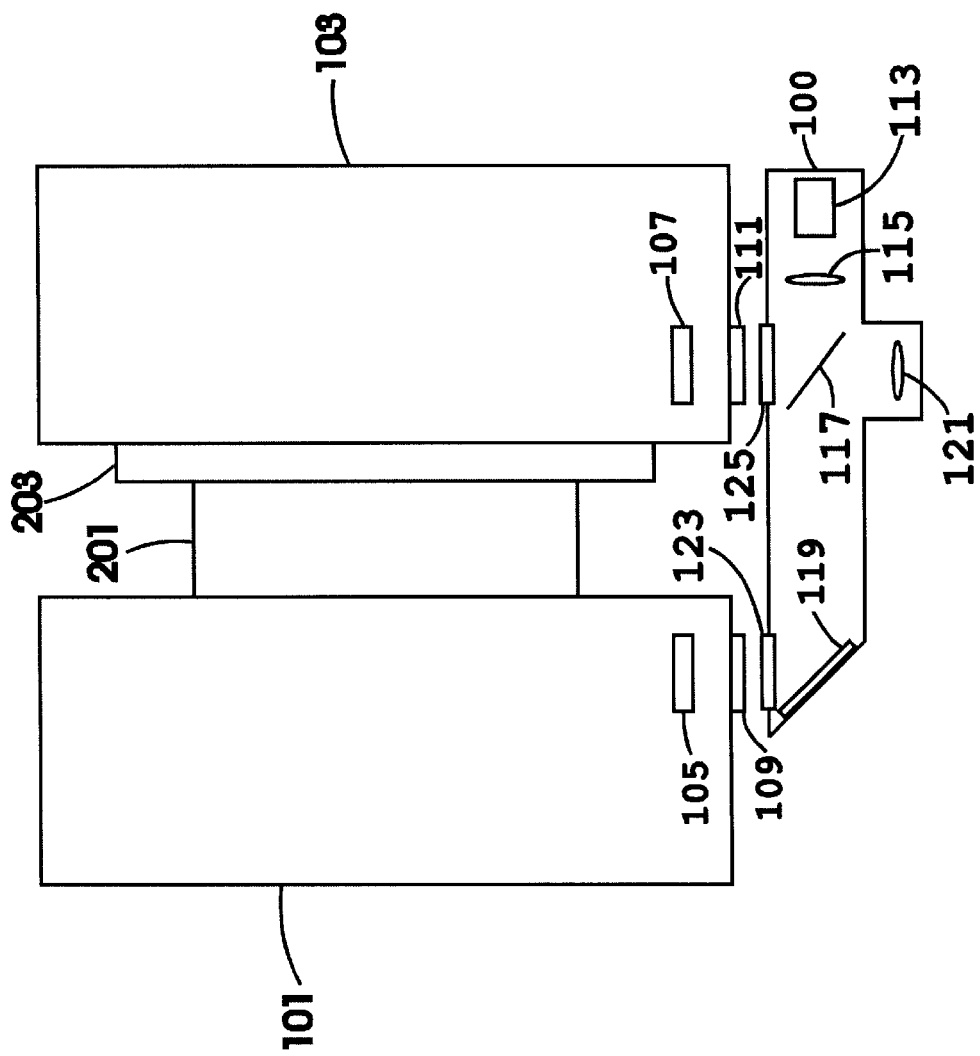
FIG. 2 shows how the interferometric alignment device is used to align optically instruments 101 and 103.

Referring now to the drawing wherein like numbers represent like parts in each of the several figures and arrows indicate the directions of optical travel, FIGS. 1 and 2 show the structure of the interferometric alignment device 100 and the elements of instruments 101 and 103 that are necessary for the device to operate properly. These necessary elements include first and second mirrors 105 and 107 that are permanently and rigidly mounted, at the factory, inside instruments 101 and 103, respectively, and optically transparent windows 109 and 111 that allow light to travel to and from the mirrors. Interferometric alignment device 100 has thereon a suitable means for communicating optically with windows 109 and 111; this communicating means may be another pair of windows 123 and 125 built into the frame of the alignment device itself. In any case, all the windows should be anti-reflection coated or tilted in their mounts to minimize interference patterns that may be generated by reflections at the window surfaces. Further, the windows must be of constant optical thickness at all points to within about a tenth of one wavelength of the laser beam emanating from laser diode 113.

Initially, the mechanical mounting of two instruments 101 and 103 on common azimuth-elevation tracking mount 201 provides a coarse alignment within the range of operation of interferometric alignment device 100 that is now removably attached to the instruments by any suitable means such as bolts, screws and latches (not shown in the figures). The initial mounting also positions windows 109 and 111 so as to allow the light originating from inside the alignment device to pass through them and be incident on mirrors 105 and 107, which process is necessary for fine-tuning the relative elevation and azimuth of the two instruments.

As illustrated in FIG. 1, during a proper operation of interferometric alignment device 100, light is emitted by visible-wavelength laser diode 113 and is collimated by collimating optics 115, thereby being formed into a beam of a pre-selected, suitable diameter. A portion of the collimated beam is reflected by beamsplitter 117 toward second mirror 107 while the remaining portion is transmitted to be incident on third mirror 119. From the third mirror, the light is further reflected to be incident on first mirror 105. To insure proper reflection from the third to the first mirror, it is imperative that the beamsplitter and the third mirror be parallel with each other as shown in the figure. Upon reflection from the first and second mirrors, the returning beams converge at beamsplitter 117 and re-combine to form a series of interference fringes visible at eyepiece 121.

Figure 3:
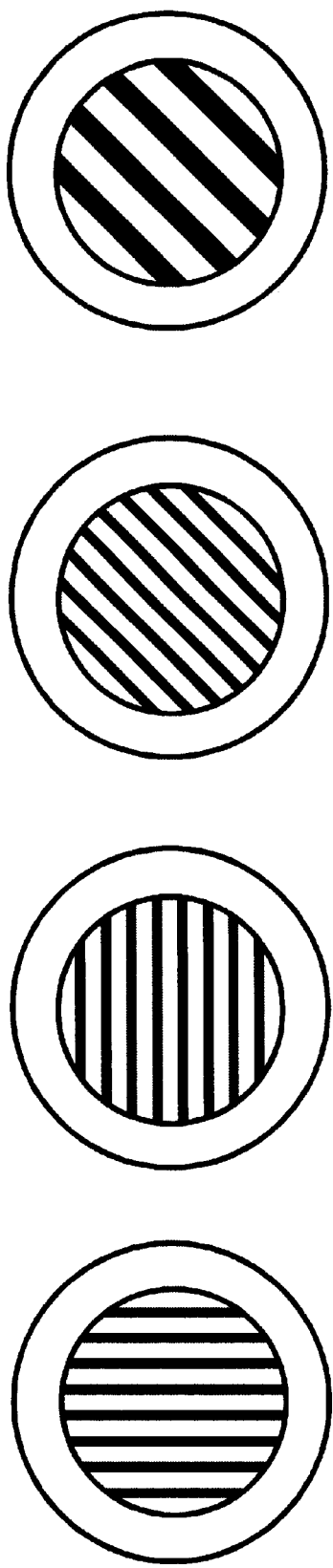
FIG. 3 illustrates an operator's view of various alignment conditions of the two instruments.

As is well known, each fringe (lateral distance from maximum to minimum brightness) represents a half-wavelength of path difference. Since each path is traversed twice by the light, each fringe represents a positional difference of ¼ wavelength between complementary points of mirrors 105 and 107. For example, when using a collimated beam of 1-inch diameter, if there appears a single fringe occupying the full diameter of the beam, the error angle is ¼ wave per inch, corresponding to an elevation error of +/−6 microradians which means that mirrors 105 and 107 can be brought to parallelism within a 6-microradian tolerance. An elevation error of +/−6 microradians is also the limit of measurement for a one-inch beam using a mid-visible wavelength. The azimuth error, with minimum elevation error, appears as fringes arrayed across the image. Error in both the azimuth and elevation produces fringes at an angle the degree of which depends upon the ratio of the error magnitudes. To achieve the alignment of the two instruments in both pitch and yaw angles, the azimuth and the elevation of second instrument 103 relative to first instrument 101 on tracking mount 201 is adjusted via adjustable bracket 203 that couples the second instrument to the tracking mount. The adjustment effort goes on until all of the fringes disappear from the field-of-view or at least become negligible in number (i.e. one or two). It is advisable that the first instrument be fixedly supported by the tracking mount so that adjustment can be performed by manipulating only one of the two instruments. FIG. 3 illustrates an operator's view of various alignment conditions of the two instruments, showing that moderate error produces an interference pattern consisting of many fringes.

For the proper operation of the interferometric alignment device, it is critical that the internal mirror of each instrument be positioned at the factory to be perfectly orthogonal to the optical axis of the instrument in both azimuth and elevation planes. Further, they must be mounted firmly enough to be maintained in this position, resisting all errors, as well as drift, due to environment and handling. The alignment process can be automated by using a fringe-counting detector and servo adjusters instead of the human operator's eyes and hands.

Figure 4:
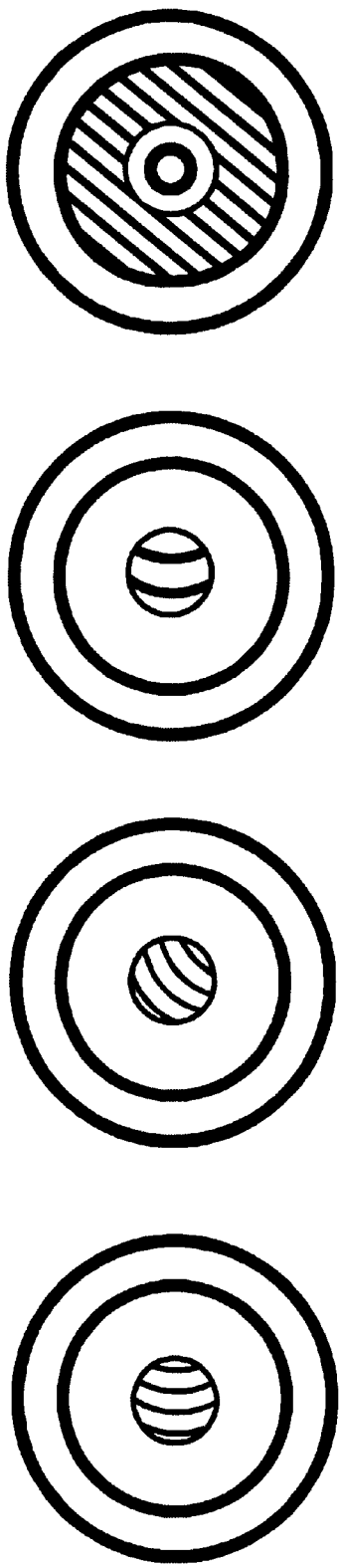
FIG. 4 shows the result of a two-stage approach using concave internal mirrors.
Figure 5:
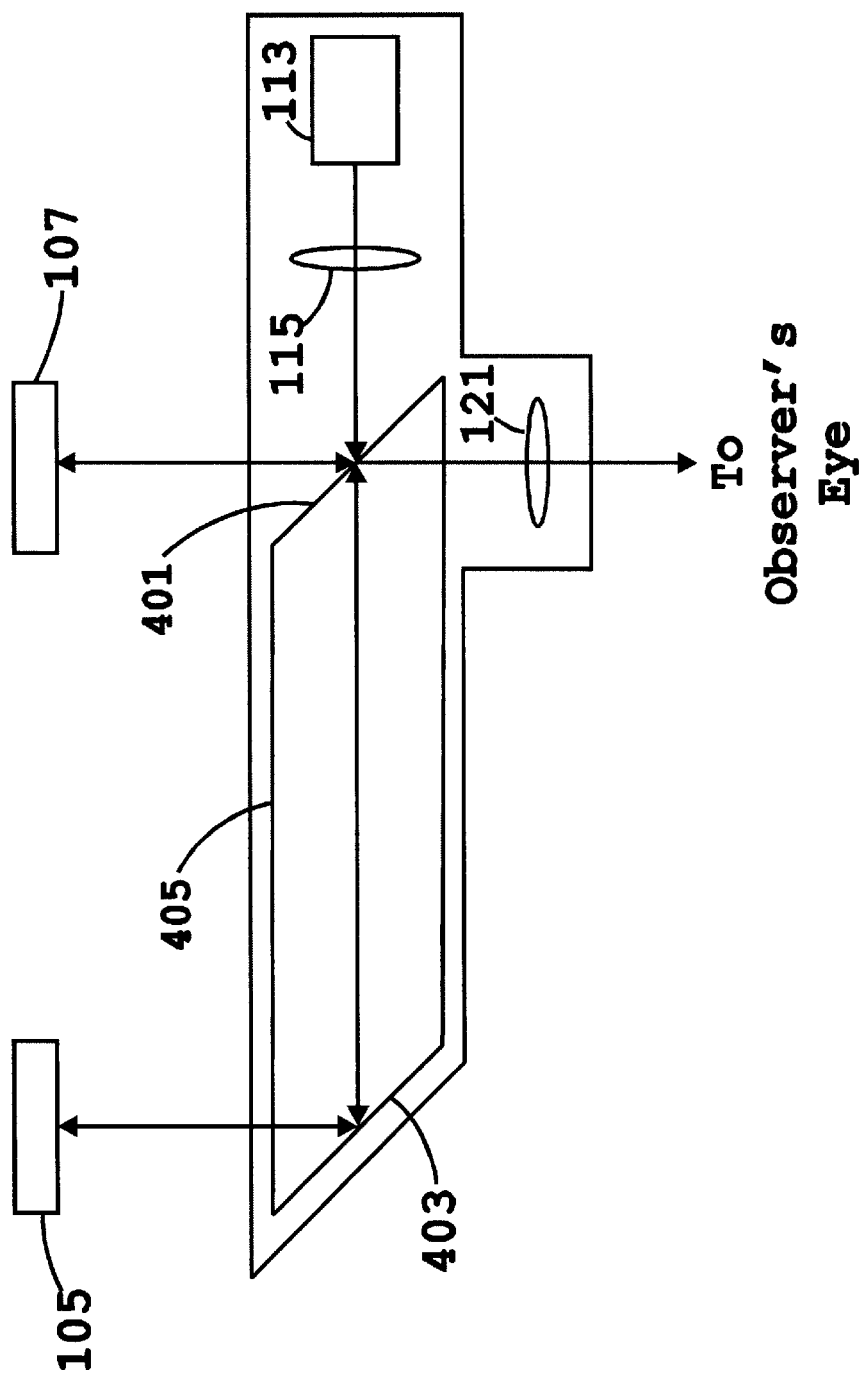
FIG. 5 shows the use of solid prism 405 in lieu of beamsplitter 117 and third mirror 119.

Although a particular embodiment and form of this invention has been illustrated, it is apparent that various modifications and embodiments of the invention may be made by those skilled in the art without departing from the scope and spirit of the foregoing disclosure. One such modification is rendering the center portion of mirrors 105 and 107 concave with a very large radius of curvature, say 10 meters. The resulting interference pattern of Newton's rings would accept a much larger initial error and permit adjustment to within the fine-tuning range of the interferometric alignment device, utilizing the flat annular surface surrounding the curved center portions of the mirrors. FIG. 4 shows the result of such a two-stage approach where the concave provides a coarse adjustment stage while the flat annulus enables fine adjustments. In the right-most image of FIG. 4, the coarse stage has been adjusted to a single fringe, which is within perhaps 50 microradians of the desired perfect boresight alignment. This allows the operator of the alignment device to resolve the fringes in the outer annulus of the image, which are then minimized by continued adjustment of one instrument relative to the other. Another modification is using solid prism 405 in lieu of beamsplitter 117 and third mirror 119. The prism comprises first end surface 401 and second end surface 403 that are perfectly parallel with each other. This eliminates any need for optical flats to ensure that the beamsplitter and the third mirror are perfectly parallel. Yet another modification is using fiber optics to provide the optical path necessary for collimating the initially narrow laser beam emitted by diode 113. Accordingly, the scope of the invention should be limited only by the claims appended hereto.

We claim:

1. An interferometric alignment device for aligning a first independent and a second independent optical instruments together so that said independent optical instruments are precisely aligned in pitch and yaw angles, said first independent instrument having a first optically transparent window and a first mirror and said second independent instrument having a second optically transparent window and a second mirror, said mirrors being permanently and rigidly mounted inside their respective independent instruments and positioned to receive any light incident thereon through their respective windows and reflect the light outwardly through their respective windows, wherein said interferometric alignment device is removably attachable to said independent optical instruments and comprises: a source of visible light; a beam splitter; a means for collimating said visible light and forward said collimated light to be incident on said beamsplitter; a third mirror positioned between said first mirror and said beamsplitter, said beamsplitter splitting said collimated light between said second and third mirrors, said third minor further reflecting the light to said first mirror, and the light reflected fl-em said mirrors combining to form fringes, said fringes being indicative of the misalignment status of said first and second independent optical instruments relative to each other; and an azimuth-elevation tracking support onto which said first and second instruments are mounted, said support enabling the adjustment of the pitch and yaw angles of said second instrument relative to said first instrument so as to minimize the number of said fringes or eliminate said fringes altogether.

* * * * *